(12) United States Patent
Maier et al.

(10) Patent No.: US 10,911,741 B2
(45) Date of Patent: Feb. 2, 2021

(54) DEVICE FOR COMMUNICATION, METHOD OF OPERATING SUCH DEVICE

(71) Applicant: NOKIA TECHNOLOGIES OY, Espoo (FI)

(72) Inventors: Simone Maier, Stuttgart (DE); Andreas Pascht, Stuttgart (DE); Wolfgang Templ, Stuttgart (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/468,233

(22) PCT Filed: Dec. 4, 2017

(86) PCT No.: PCT/EP2017/081295
§ 371 (c)(1),
(2) Date: Jun. 10, 2019

(87) PCT Pub. No.: WO2018/104198
PCT Pub. Date: Jun. 14, 2018

(65) Prior Publication Data
US 2020/0014911 A1    Jan. 9, 2020

(30) Foreign Application Priority Data
Dec. 9, 2016 (EP) .................................. 16203199

(51) Int. Cl.
*H04N 13/31* (2018.01)
*G06T 7/73* (2017.01)
*H04N 13/32* (2018.01)
*H04N 13/366* (2018.01)
(Continued)

(52) U.S. Cl.
CPC ............. *H04N 13/31* (2018.05); *G02B 30/00* (2020.01); *G06T 7/73* (2017.01); *H01Q 1/44* (2013.01); *H04N 13/32* (2018.05); *H04N 13/366* (2018.05)

(58) Field of Classification Search
None
See application file for complete search history.

(56) References Cited

U.S. PATENT DOCUMENTS

2002/0101506 A1    8/2002    Suzuki
2010/0123952 A1    5/2010    Chen et al.
(Continued)

OTHER PUBLICATIONS

International Search Report and Written Opinion dated Mar. 13, 2018 corresponding to International Patent Application No. PCT/EP2017/081295.
(Continued)

*Primary Examiner* — Christopher G Findley
(74) *Attorney, Agent, or Firm* — Squire Patton Boggs (US) LLP

(57) ABSTRACT

A device (100) comprising an antenna array (102) having a plurality of transmit and receive antennas (104) for wireless radio communication and a display (106) for displaying a stereoscopic image (108), wherein the stereoscopic image (108) is visible to an observer (110A, 110B) at a position (112A, 112B), wherein the antenna array (102) and the display (104) are arranged so that from the position (112A, 112B) the observer's view of at least a part of the antenna array (102) is obstructed by the display (106). A method for operating the device.

11 Claims, 3 Drawing Sheets

(51) Int. Cl.
    *G02B 30/00*    (2020.01)
    *H01Q 1/44*    (2006.01)

(56) References Cited

U.S. PATENT DOCUMENTS

| | | | | |
|---|---|---|---|---|
| 2012/0314017 | A1* | 12/2012 | Gross | H04N 13/315 |
| | | | | 348/14.07 |
| 2013/0169529 | A1* | 7/2013 | Ek | G02B 30/24 |
| | | | | 345/156 |
| 2014/0016908 | A1* | 1/2014 | Sakaniwa | H04N 13/332 |
| | | | | 386/230 |
| 2015/0155614 | A1 | 6/2015 | Youn et al. | |
| 2016/0059128 | A1* | 3/2016 | Ito | A63F 13/52 |
| | | | | 463/32 |

OTHER PUBLICATIONS

Hakan Urey et al: "State of the Art in Stereoscopic and Autostereoscopic Displays," Proceedings of the IEEE, IEEE, vol. 99, No. 4, Apr. 1, 2011, pp. 540-555.

European Office Action issued in corresponding European Patent Application No. 16 203 199.1-1220 dated May 19, 2020.

* cited by examiner

DEVICE FOR COMMUNICATION, METHOD OF OPERATING SUCH DEVICE

FIELD OF THE INVENTION

The invention concerns a device for communication, in particular a massive multiple input and multiple output antenna array, and a method of operating such device.

BACKGROUND

Antenna arrays for massive multiple input and multiple output consist of multiple antennas in individual housings. The housings are installed for example spaced apart from each other as a matrix with several rows and columns. In publicly accessible areas, communication with persons via the antenna array requires a suitable terminal. For communication with persons that do not possess any suitable terminal, signs or displays may be installed in the publicity accessible area. The considerable size of antenna arrays for massive multiple input and multiple output however has an adverse effect on the installation of the antenna array, the signs and the displays, and hence on the impression of the publicly accessible area.

US 2015/0155614 A1 discloses a mobile terminal including a plurality of antennas that operate in MIMO and a stereoscopic display unit covering the plurality of antennas.

US 2010/0123952 A1 discloses a stereoscopic image display apparatus having a function for tracking at least one observer.

US 2002/0101506 A1 discloses a viewpoint position detecting apparatus.

SUMMARY

It is therefore an objective of the present invention to provide an improved device for communication.

This goal is achieved by a device comprising an antenna array having a plurality of transmit and receive antennas for wireless radio communication and a display for displaying a stereoscopic image, wherein the stereoscopic image is visible to an observer at a position, wherein the antenna array and the display are arranged so that from the position the observer's view of at least a part of the antenna array is obstructed by the display. The display covering the antenna array at least partially blocks the view of the antenna array. For a massive multiple input multiple output, MMIMO, array the stereoscopic image hides the mechanical outline of the large antenna array. The observers instead may be presented a beautiful levitating optical picture, in particular a hologram, i.e. the stereoscopic image. For the display no additional mechanical fixing is needed in the publicly accessible area.

These stereoscopic images can either be a nice fancy picture, display the background behind the antenna array or video footage. The display can be rented to marketing companies for commercials as well.

Any required power and data connection is already available at the MMIMO antenna array location and may be used for the display.

Advantageously, the antenna array and the display are arranged so that from the position the observer's view of the entire antenna array is obstructed by the display. This way the cover matches the dimensions of the antenna array for improved appearance and display size.

Advantageously, the device comprises a controller and a detector, wherein the detector is adapted to detect information about a position of an observer of the display, and wherein the controller is adapted to control the display according to the information about the position of the observer of the display. The observer can be presented this way with an individual hologram.

Advantageously, the detector is a motion sensor, a radar sensor adapted to determine the position of the observer from a radar signal reflected by the observer, or wherein the detector is adapted to determine the position of the observer from a beam steering information for steering the beam of at least one of the plurality of transmit and receive antennas towards a terminal in communication with the antenna array. The presence of observers may be detected either by radar detection, information used for beamforming or the motion sensor. The position of the observer is hence detected reliably.

Advantageously, the display is maskable by an adjustable horizontal parallax barrier, AHPB, wherein the controller is adapted for adjusting a geometrical parameter or a position of the AHPB for displaying the stereoscopic image visible to the observer at the position of the observer.

The AHPB provides a mask and allows for adjusting the geometrical parameters and position of the mask accordingly in order to allow for displaying the stereoscopic image at the actual observer position which has been measured by motion sensor, radar, or by evaluation of the available MMIMO beam steering information in case the observer has a terminal communicating with the MMIMO system. The AHPB is for example adjustable on basis of liquid crystal display, LCD, elements. The controller may control the LCD display to change the mask, i.e. the geometry of unmasked sections and the position of unmasked sections.

Advantageously, the display comprises a passive screen for displaying stereoscopic images on a front side of the passive screen, wherein the stereoscopic images are projected onto the front side or onto a back side of the passive screen by a projector, and wherein the controller is adapted to control the projector and the AHPB synchronously for displaying the stereoscopic image visible to the observer at the position of the observer. Depending on the environment, the display may be external to the MMIMO antenna array. Internal active or passive screens provide a highly integrated, compact solution. Passive screens with external projector reduce the performance degradation of the antenna array further at the cost of additional wiring for connecting the projector. External in this context means that the devices use different housing and are at different geographic locations.

Advantageously, the detector is adapted to detect a plurality of individual positions of a plurality of individual observers, and wherein the controller is adapted to control the display and the AHPB synchronously for displaying a plurality of individual images to the plurality of individual observers at the plurality of individual positions. In holography systems the visible picture depends on the position of the individual observers. More accurately, depending on the position of the observers' eyes relative to the display, different images need to be displayed. In this scenario the observers' eyes are in different locations and so see different images if the AHPB is synchronized. Additionally, the system may generate various images for a plurality of positions, in particular for all possible positions of the observers' eyes.

Advantageously, the detector is adapted to detect presence and/or absence of observers, and wherein the controller is adapted to control the display and the AHPB for displaying the stereoscopic image if the presence of at least one observer is detected, and to control the display and the AHPB for not displaying the stereoscopic image if the absence of observers is detected. This way, if no observers are present, the holography system can be put to sleep mode when nobody is around, to save power, and wake up again, once observers arrive.

Advantageously, the display comprises an active screen. This way the MMIMO antenna array may be integrated with the display.

Advantageously, the device is adapted to display different stereoscopic images visible to different observers at different positions of the different observers. This way a plurality of different images may be presented at a plurality of positions.

Advantageously, the device is configurable for MMIMO radio communication. MMIMO antenna arrays are big in size. This means that the display is adapted to cover the MMIMO antenna array while allowing MMIMO radio communication.

Regarding the method, the problem is solved by a method of operating a device comprising an antenna array having a plurality of transmit and receive antennas for wireless radio communication and a display for displaying a stereoscopic image visible to an observer at a position, wherein the antenna array and the display are arranged so that from the position the observer's view of at least a part of the antenna array or the entire antenna array is obstructed by the display, the method comprising detecting information about the position of the observer of the display, and controlling the display according to the information about the position of the observer of the display for displaying the stereoscopic image visible to the observer at the position.

Advantageously, the method comprises determining the position of the observer from a motion sensor output, from a radar signal reflected by the observer, or determining the position of the observer from a beam steering information for steering the beam of at least one of the plurality of transmit and receive antennas towards a terminal in communication with the antenna array.

Advantageously, the display is maskable by an adjustable horizontal parallax barrier, AHPB, and the method comprises adjusting a geometrical parameter or a position of the AHPB for displaying the stereoscopic image visible to the observer at the position of the observer.

Advantageously, the method comprises detecting the presence and absence of observers, and controlling the display and the AHPB for displaying the stereoscopic image if the presence of at least one observer is detected, and controlling the display and the AHPB for not displaying the stereoscopic image if the absence of observers is detected.

Advantageously, the method comprises displaying different stereoscopic images visible to different observers at different positions of the different observers.

Further developments of the invention can be gathered from the dependent claims and the following description.

DESCRIPTION OF THE EMBODIMENTS

Figure 1:
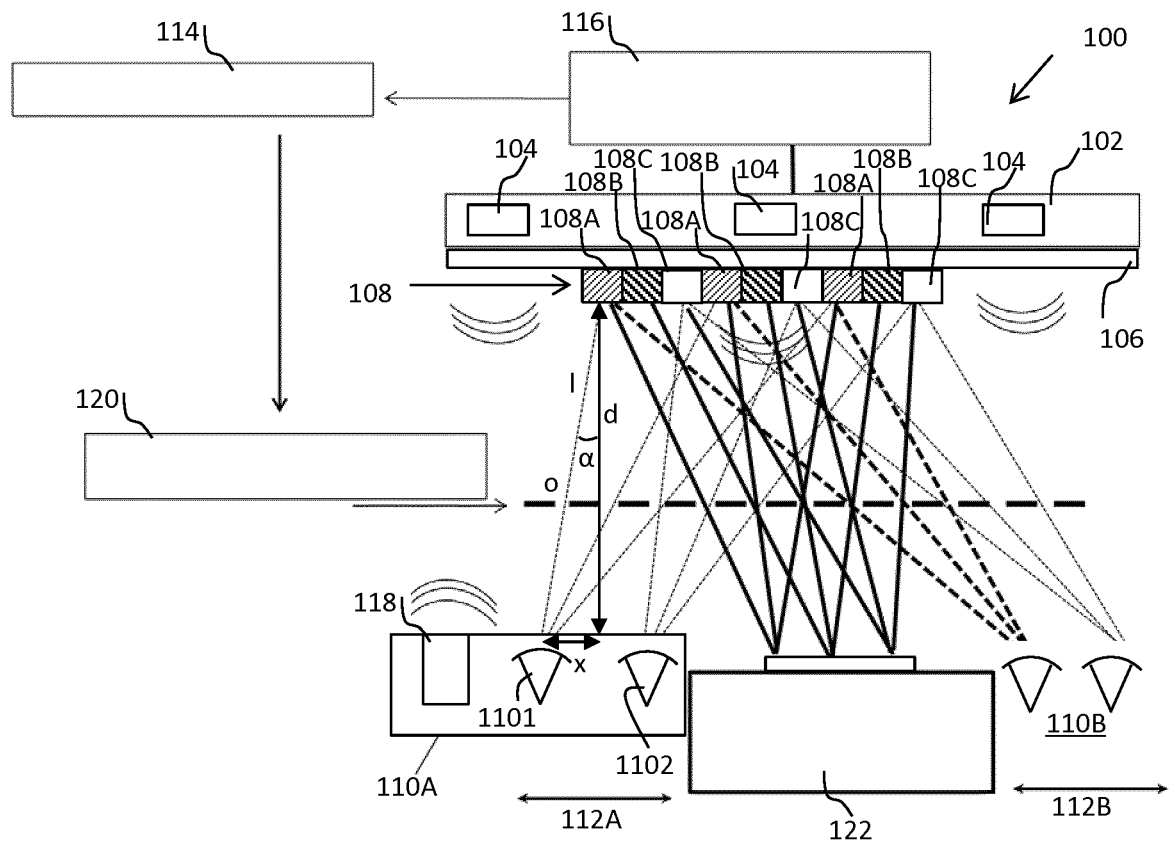
FIG. 1 schematically depicts part of a device comprising an antenna array.

FIG. 1 schematically depicts part of a device 100 comprising an antenna array 102.

The antenna array 102 is for example a massive multiple input and multiple output, MIMO, antenna array having a plurality of transmit and receive antennas 104 for wireless radio communication according to a presently known wireless communication standard, e.g. IEEE 802.11n (Wi-Fi), IEEE 802.11ac (Wi-Fi), HSPA+(3G), WiMAX (4G), and Long Term Evolution (4G) and beyond (5G).

The device 100 comprises a display 106 for displaying a stereoscopic image 108. The stereoscopic image 108 is for example a hologram. The stereoscopic image 108 is visible to an observer 110A, 110B at a position 112A, 112B, in particular in front of the display 106.

The antenna array 102 and the display 106 are arranged so that from the position 112A, 112B the observer's view of at least a part of the antenna array 102 is obstructed by the display 106. Preferably the antenna array 102 and the display 106 are arranged so that from the position 112A, 112B the observer's view of the entire antenna array 102 is obstructed by the display 106.

The device 100 comprises a controller 114 and a detector 116.

The detector 116 is adapted to detect information about the position 112A, 112B of the observer 110A, 110B of the display 106.

The controller 114 is adapted to control the display 106 according to the information about the position of the observer 110A, 110B of the display 106.

The detector 116 is preferably a motion sensor, or a radar sensor adapted to determine the position 112A, 112B of the observer 110A, 110B from a radar signal reflected by the observer. Alternatively, or additionally, the detector 116 may be adapted to determine the position 112A of the observer 110A from a beam steering information for steering the beam of at least one of the plurality of transmit and receive antennas towards a terminal 118 in communication with the antenna array 102.

The display 106 is maskable by an adjustable horizontal parallax barrier, AHPB, 120. In this context non-adjustable LCD parallax barriers are known. Non-adjustable liquid crystal display, LCD, parallax barriers allow for stereoscopic large scale display which delivers stereoscopic pictures without needing the user to wear any specific 3D-glasses. The principle of their operation is for example described by Efrat et al. in "Cinema 3D: Large Scale Automultiscopic Display" ISBN: 978-1-4503-4279-7/16/07.

The controller 114 is adapted for adjusting a geometrical parameter or a position of the AHPB 120 for displaying the stereoscopic image 108 visible to the observer 110A, 110B at the position 112A, 112B of the observer 110A, 110B.

The display 106 may comprise an active screen for displaying stereoscopic images. Active screen refers to a screen using any type of active display technology like liquid crystal display, LCD, light emitting diode, LED, or Plasma technology. The display 106 may comprise, as depicted in FIG. 1, a passive screen for displaying stereoscopic images on a front side of the passive screen. The stereoscopic images are in this case either projected onto the front side or onto a back side of the passive screen by a projector 122. Passive screen refers to a front projection screen or a rear projection screen. The controller 114 is in this case adapted to control the projector 122 and the AHPB 120 synchronously for displaying the stereoscopic image visible to the observer 110A, 110B at the position 112A, 112B of the observer 110A, 110B.

At different positions 112A, 112B the hologram may be the image of an object or subject recorded from different viewing angles. To achieve the holographic effect, individual eyes of an observer are presented with different images. This is explained below for one observer 110A and applies to other observers 110B as well.

A left eye 1101 and a right eye 1102 are spaced apart from each other and from the display 106. The position of an observer 110A and the display 106 are spaced apart in the example by a distance d. The display 106 is adapted to display a plurality of individual images 108A, 108B, 108C recorded from different viewing angles. The stereoscopic image 108 is created for the observer 110A by display of the individual image 108A to the left eye 1101 and by display of the individual image 108C to the right eye 1102. In particular, the geometrical parameter or the position of the AHPB 120 are adjusted to display different pixel that form the individual images 108A, 108B, 108C to the left eye 1101 and the right eye 1102. This means for example the AHPB 120 blocks the view of the left eye 1101 or the right eye 1102 to pixels that do not belong to the respective individual image 108A, 108B, 108C. In FIG. 1, an individual viewing angle α is the angle between the line of sight 1 from the left eye 1101 to the leftmost part of individual image 108A and a plane perpendicular to the display 106. In the example the perpendicular plane contains the distance d. Assuming that the left eye 1101 and the right eye 1102 are spaced apart from each other by $2x$, the individual viewing angle α for the left eye 1101 is determined from $\tan \alpha = x/d$. Based on the individual viewing angle α the geometrical parameter or the position of the AHPB 120 can be controlled for creating opening o for line of sight 1 to the leftmost part of the individual image 108A. Applying the same considerations to any other part of the individual image 108A allows creating corresponding openings for line of sight from the left eye 1101 to the other parts. Likewise, for the right eye, the lines of sight to the parts of the individual image 108C are opened.

For the other observer 110B, individual images 108A and 108C form the stereoscopic image 108 as well. Based on the same considerations, the lines of sight to the parts of the individual images 108A and 108C are opened.

For both, the lines of sight to the individual image 108B remain blocked.

The granularity of the individual viewing angle α may allow displaying the same image for two or more individual observes 110A, 110B to view the same image 108A, 108C. For example, the individual parts of the individual parts of the image 108A and the opening o are large to allow line of sight from various positions.

The detector 116 is preferably adapted to detect a plurality of individual positions 112A, 112B of a plurality of individual observers 110A, 110B. In this case the controller 114 is adapted to control the display 106 and the AHPB 120 synchronously for displaying the plurality of individual images 108A, 108C to the plurality of individual observers 110A, 110B at the plurality of individual positions 112A, 112B. The granularity of the viewing angle displaying the same image may allow for two or more individual observes 110A, 110B to view the same image 108A, 108C.

The detector 116 may be adapted to detect presence and/or absence of observers 110A, 110B. For example, the controller 114 may be adapted to control the display 106 and the AHPB 120 for displaying the stereoscopic image if the presence of at least one observer 110A, 110B is detected, and to control the display 106 and the AHPB 120 for not displaying the stereoscopic image if no observers 110A, 110B are detected. Alternatively, the controller 114 may be adapted to control the display 106 and the AHPB 120 for not displaying the stereoscopic image if the absence of at least one observer 110A, 110B is detected, and to control the display 106 and the AHPB 120 for displaying the stereoscopic image if at least one observer 110A, 110B appears to be present. Of course, both presence and absence of observers 110A, 110B may be detected to control displaying and not displaying the stereoscopic image respectively.

The device 100 may be adapted to display different stereoscopic images 108A, 108B, 108C visible to different observers 110A, 110B at different positions 112A, 112B of the different observers 110A, 110B as well.

Figure 2:
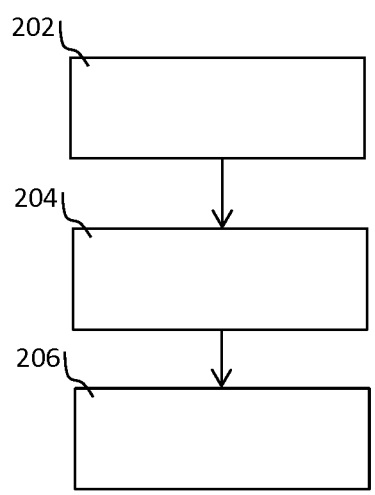
FIG. 2 schematically depicts steps in a method of operating such device.

A method of operating the device 100 is described below referencing FIG. 2.

The method comprises a step 202 of detecting information about the position 112A, 112B of the observer 110A, 110B of the display 106. The position 112A, 112B of the observer 110A, 110B may be detected from the motion sensor output, or from the radar signal reflected by the observer. The position of the observer 110A, 110B may be detected from the beam steering information for steering the beam of at least one of the plurality of transmit and receive antennas 104 towards the terminal 118 in communication with the antenna array 102.

The method comprises a step 204 of controlling the display 106 according to the information about the position 112A, 112B of the observer 110A, 110B of the display 106 for displaying the stereoscopic image visible to the observer 110A, 110B at the position 112A, 112B.

The method comprises a step 206 of adjusting the geometrical parameter or the position of the AHPB 120 for displaying the stereoscopic image visible to the observer 110A, 110B at the position 112A, 112B of the observer 110A, 110B.

The steps 202 to 206 are executed for example repeatedly. The steps 204 to 206 are preferably executed synchronously. The order of the steps may vary, not all of the steps have to be executed every iteration.

An optional step comprises detecting the presence and/or absence of observers 110A, 110B, and controlling the display 106 and the AHPB 120 for displaying the stereoscopic image if the presence of at least one observer 110A, 110B is detected, and controlling the display 106 and the AHPB 120 for not displaying the stereoscopic image if the absence of observers 110A, 110B is detected.

Preferably the method comprises displaying different stereoscopic images visible to different observers 110A, 110B at different positions 112A, 112B of the different observers 110A, 110B. The steps 202 to 206 are preferably synchronized to the movement of the different observers 110A, 110B.

Figure 3:
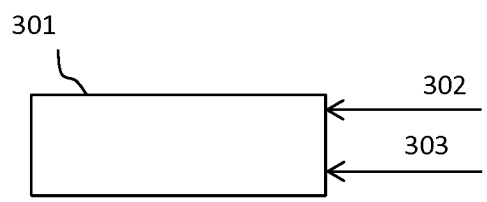
FIG. 3 schematically depicts part of a first embodiment of the device.

FIG. 3 schematically depicts part of a first embodiment of the device 100. According to the first embodiment, the MMIMO antenna array and the entire holography system are separate units that are collocated in a system 301 having a power connection 302 and a data connection 303. For example, the device 100 according to the first embodiment comprises the active display and the MMIMO antenna array.

Figure 4:
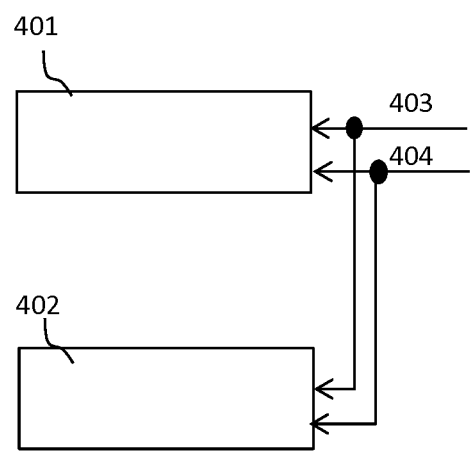
FIG. 4 schematically depicts part of a second embodiment of the device.

FIG. 4 schematically depicts part of a second embodiment of the device 100. According to the second embodiment, a first unit 401 comprises the MMIMO antenna array and a second unit 402 comprises the holography system. The units are separate independent units at different geographic locations. A power connection 402 and a data connection 403 to the first unit 401, i.e. the MMIMO antenna array, are also used for the second unit 402. This provides more flexibility for positioning the holography system while avoiding separate power and/or data connections.

Figure 5:
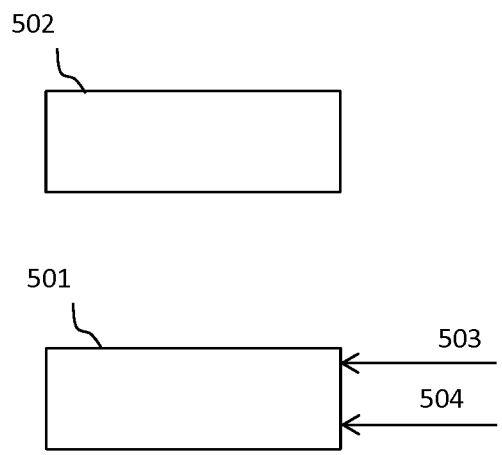
FIG. 5 schematically depicts part of a third embodiment of the device.

FIG. 5 schematically depicts part of a third embodiment of the device 100. According to the third embodiment, a first unit 501 comprises the MMIMO antenna array and a second unit 502 comprises the holography system. The units are separate independent units at different geographic locations. A power connection 502 and a data connection 503 to the first unit 501, i.e. the MMIMO antenna array, are not used for the second unit 502. This provides even more flexibility for positioning the holography system because separate power and/or data connections may be used.

Figure 6:
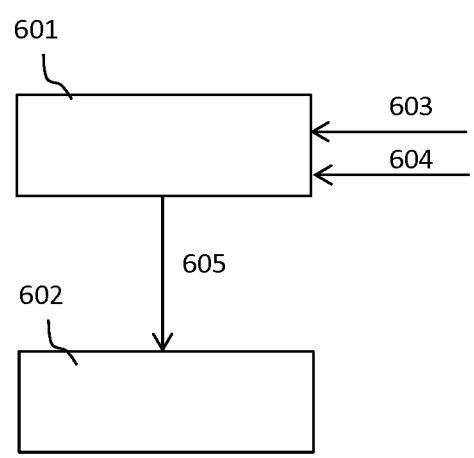
FIG. 6 schematically depicts part of a fourth embodiment of the device.

FIG. 6 schematically depicts part of a fourth embodiment of the device. According to the fourth embodiment, a first unit 601 comprises the MMIMO antenna array and a second unit 602 comprises the holography system. The units are separate independent units at different geographic locations. A power connection 602 and a data connection 603 supply the first unit 601, i.e. the MMIMO antenna array. An additional data connection 605 connects the first unit 601 and the second unit 602. The additional data connection 605 is used to send observer information, e.g. a position of the observer, detected by the motion sensor, the radar sensor or from beamforming information, is sent to the second unit 602. This way, information about the observer is provided, e.g. to the controller 114.

The aforementioned power connections are for example mains electricity connections or connect to renewable energy sources, e.g. solar panels, in the perimeter of the device. The data connections are for example according to the well-known Wireless Local Area Network, Ethernet, Transmission Control Protocol and/or Internet Protocol standard.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

unit 602 comprises the holography system. The units are separate independent units at different geographic locations. A power connection 602 and a data connection 603 supply the first unit 601, i.e. the MMIMO antenna array. An additional data connection 605 connects the first unit 601 and the second unit 602. The additional data connection 605 is used to send observer information, e.g. a position of the observer, detected by the motion sensor, the radar sensor or from beamforming information, is sent to the second unit 602. This way, information about the observer is provided, e.g. to the controller 114.

The aforementioned power connections are for example mains electricity connections or connect to renewable energy sources, e.g. solar panels, in the perimeter of the device. The data connections are for example according to the well-known Wireless Local Area Network, Ethernet, Transmission Control Protocol and/or Internet Protocol standard.

The description and drawings merely illustrate the principles of the invention. It will thus be appreciated that those skilled in the art will be able to devise various arrangements that, although not explicitly described or shown herein, embody the principles of the invention. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A device, comprising:
an antenna array having a plurality of transmit and receive antennas for wireless radio communication, and a display for displaying a stereoscopic image, wherein the stereoscopic image is configured to be visible to an observer at a position, wherein the antenna array and the display are configured such that from the position, the observer's view of at least a part of the antenna array is obstructed by the display; the device further comprising
a controller; and
a detector, wherein the detector is configured to detect information about the position of the observer of the display,
wherein the controller is configured to control the display according to the information about the position of the observer of the display,
wherein the display is maskable by an adjustable horizontal parallax barrier, AHPB,
wherein the controller is configured for adjusting a geometrical parameter or a position of the AHPB for displaying the stereoscopic image visible to the observer at the position of the observer,
wherein the display comprises a passive screen for displaying stereoscopic images on a front side of the passive screen,
wherein the stereoscopic images are projected onto the front side or onto a back side of the passive screen by a projector, and
wherein the controller is configured to synchronously control the projector and the AHPB for displaying the stereoscopic image visible to the observer at the position of the observer.

2. The device according to claim 1, wherein the detector comprises a motion sensor, a radar sensor configured to determine the position of the observer from a radar signal reflected by the observer, or wherein the detector is configured to determine the position of the observer from a beam steering information for steering the beam of at least one of the plurality of transmit and receive antennas towards a terminal in communication with the antenna array.

3. The device according to claim 1, wherein the detector is configured to detect a plurality of individual positions of a plurality of individual observers, and wherein the controller is configured to control the display and the AHPB synchronously for displaying a plurality of individual images to the plurality of individual observers at the plurality of individual positions.

4. The device according to claim 1, wherein the detector is configured to detect presence or absence of observers, and wherein the controller is configured to control the display and the AHPB for displaying the stereoscopic image if the presence of at least one observer is detected, and to control the display and the AHPB for not displaying the stereoscopic image if the absence of observers is detected.

5. The device according to claim 1, wherein the display comprises an active screen.

6. The device according to claim 1, configured to display different stereoscopic images visible to different observers at different positions of the different observers.

7. The device according to claim 1, configurable for massive multiple-input and multiple-output radio communication.

8. A method of operating a device comprising an antenna array having a plurality of transmit and receive antennas for wireless radio communication, and a display for displaying a stereoscopic image visible to an observer at a position, wherein the antenna array and the display are configured such that from a position of an observer, the observer's view of at least a part of the antenna array or the entire antenna array is obstructed by the display, the method comprising
 detecting information about a position of an observer of the display;
 controlling the display according to the information about the position of the observer of the display for displaying the stereoscopic image visible to the observer at the position, wherein the display is maskable by an adjustable horizontal parallax barrier, AHPB;
 adjusting a geometrical parameter or a position of the AHPB for displaying the stereoscopic image visible to the observer at the position of the observer, wherein the display comprises a passive screen for displaying stereoscopic images on a front side of the passive screen;
 projecting the stereoscopic images onto the front side or onto a back side of the passive screen by a projector; and
 synchronously controlling the projector and the AHPB for displaying the stereoscopic image visible to the observer at the position of the observer.

9. The method according to claim 8, comprising
 determining the position of the observer from a motion sensor output, from a radar signal reflected by the observer; or
 determining the position of the observer from a beam steering information for steering the beam of at least one of the plurality of transmit and receive antennas towards a terminal in communication with the antenna array.

10. The method according to claim 9, further comprising:
 detecting presence and absence of observers; and
 controlling the display and the AHPB for displaying the stereoscopic image if the presence of at least one observer is detected, and controlling the display and the AHPB for not displaying the stereoscopic image if the absence of observers is detected.

11. The method according to claim 8, further comprising displaying different stereoscopic images visible to different observers at different positions of the different observers.

* * * * *